Aug. 23, 1932.  W. R. SMITTLE  1,873,495

FLEXIBLE PIPE JOINT

Filed Jan. 27, 1932

Inventor

Walter R. Smittle

By Clarence A. O'Brien

Attorney

Patented Aug. 23, 1932

1,873,495

UNITED STATES PATENT OFFICE

WALTER R. SMITTLE, OF ST. LOUIS, MISSOURI

FLEXIBLE PIPE JOINT

Application filed January 27, 1932. Serial No. 589,246.

My invention relates to an improved flexible pipe joint, involving automatic packing positioning means, together with novel packing arrangements, and means to lubricate the joint.

It is an important object of my invention to provide a flexible pipe joint of this type which includes comparatively few parts, and which are so engaged as to be readily flexed and moved with respect to each other, while maintaining a fluid-tight relationship, and wherein the packing means has cooperating therewith automatic means for adjusting the wear thereof and positioning the same.

It is also an important object of my invention to provide a joint of the type described wherein the related elements may be rotated at different speeds, and with the axes of rotation of the connected elements out of coincidence, and in which friction is practically eliminated.

It is also an important object of my invention to provide a device of the character described in which back pressure and any other obstruction to the passage of fluid therethrough is eliminated in a practical manner and to a greater extent than in prior similar devices.

Other objects and advantages of my invention will be apparent from the following description and the drawing, wherein for purposes of illustration I have shown a preferred embodiment of the invention.

In the drawing:—

Figure 1:
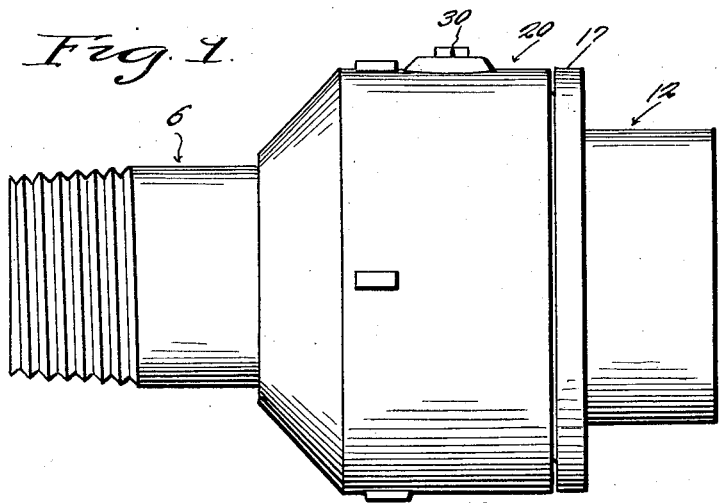
Figure 1 is a side elevational view of an embodiment of the invention.

Referring to the drawing in detail, wherein like numerals relate to like parts throughout the same, the numeral 5 generally designates the device of my invention which consists of the male element 6 which is in the form of an externally screw-threaded nipple having an enlarged externally spherical portion 7 which has a counterbore 8 larger than the bore 9 of the nipple portion. The spherical portion is slightly more than hemi-spherical and provided at the inward end with a flat right angular face 10 for engaging the packing generally designated 11 in a manner to be described.

Figure 2:
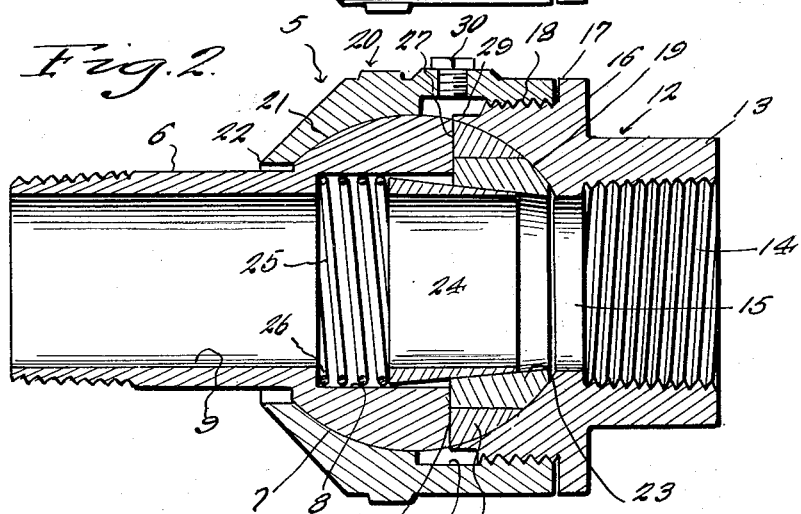
Figure 2 is a longitudinal vertical sectional view therethrough.
Figure 3:
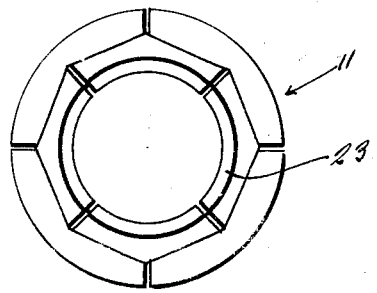
Figure 3 is an end view of the packing taken from the left as seen in Figure 2.
Figure 4:
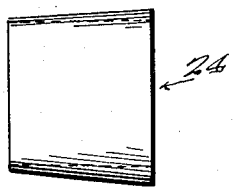
Figure 4 is an elevational view of the tapered packing adjusting sleeve.

The female member of the device generally designated 12 consists of an enlarged receptor designated 13 internally screw-threaded as indicated at 14 and provided at the inward termination of the screw-threaded portion 14 with a portion 15 having a reduced bore. An enlarged shoulder portion 16 of solid construction is provided with the outstanding flange 17 which has inwardly thereof the externally screw-threaded portion 18 which is spherically recessed as at 19 with the same radius as the spherical portion 7 of the male member. The packing 11 is disposed in direct contact with the spherically recessed portion 19 as shown in Figure 2.

Assembling means in the form of a coupling member generally designated 20 has at one end the internally screw-threaded portion engaged with the external screw-thread 18, and a spherically recessed portion 21 adapted to engage with the spherical portion 7 of the male member. Proper clearance is provided as at 22 between the member 20 and the nipple portion of the male member as seen in Figure 2. It will be obvious that screwing the assembling means 20 upon the threaded portion 18 of the member 12 will bring the spherical portion 7 into engagement with the packing 11, which, in turn, will be engaged with the spherically recessed portion of the receptor 12.

The parts described above are believed to be, in general, found in various types of ball-joints and flexible couplings. However, I believe that the method of arranging and operating the packing means for such a joint as described below, constitutes the principal part of my invention.

It will be observed that the sectional packing 11 has a tapered bore 23, the small end of which corresponds substantially with the reduced bore 15 in the female member or receptor 12. Within the divergent end of the bore of the packing 11 is entered a tapering tubular sleeve 24, adapted to act as a wedge, under the influence of a coiled spring 25 engaged with the divergent end of the sleeve 24 and with the shoulder 26 defined by the nipple portion 6 of the enlarged bore 8. It will be observed that the divergent end of the sleeve 24 is preferably large enough to be closely but movably held in the enlarged bore 8, and the spring 25 is also preferably of a diameter to operate closely and smoothly in the enlarged bore 8. It will be observed that while the interior surface of the packing 11 is tapered, the outside surface of the sleeve 24 is tapered.

The action of the spring 25 is to force the sleeve 24 into engagement with the packing 11 whereby to move and expand the packing into contact with the spherical surface 19 of the female member or receptor, which action also increases the abutting engagement of the flat face 27 of the packing with the flat faced end of the spherical member 7 of the male member, thereby maintaining at all times a fluid-tight and smooth acting joint, in which compensation for wear is automatic. It will be observed that the passages through the female member, the packing, the tubular sleeve 24, the spring 25, and the nipple portion 6 of the male member is practically uniform in diameter, and that there are no obstructions offered to the passage therethrough of fluid.

An annular chamber 28 formed by recessing the member 20 and the member 12 at 29, provides a container for a suitable lubricant to be introduced therein through a hole closed by the plug 30, whereby to increase the flexibility and serviceability of the joint.

While I have shown and described herein a preferred embodiment of the invention, it is to be understood that changes in size, shape and material may be made without departure from the spirit of the invention and the scope of the subjoined claims.

What is claimed is:—

1. A flexible pipe coupling, comprising, a spherical male member, a female member for receiving rotatably the male member, assembling means for the members, packing means disposed between the male member and the female member, packing expanding means, and spring means for actuating the packing expanding means, said packing means being located at the inward end of the male member.

2. A flexible pipe coupling, comprising, a spherical male member, a female member for receiving rotatably the male member, assembling means for the members, packing means disposed between the male member and the female member, packing expanding means, and spring means for actuating the packing expanding means, said expanding means being arranged within the packing means.

3. A flexible pipe coupling, comprising, a spherical male member, a female member for receiving rotatably the male member, assembling means for the members, packing means disposed between the male member and the female member, packing expanding means, and spring means for actuating the packing expanding means, said expanding means being arranged within the packing means, said spring means being arranged to act externally upon the expanding means.

4. A flexible pipe coupling, comprising, a spherical male member, a female member for receiving rotatably the male member, assembling means for the members, packing means disposed between the male member and the female member, packing expanding means, and spring means for actuating the packing expanding means, said packing means being located at the inward end of the male member, said packing expanding means comprising a pair of annular members in wedge relation.

5. A flexible pipe coupling, comprising, a spherical male member, a female member for receiving rotatably the male member, assembling means for the members, packing means disposed between the male member and the female member, packing expanding means, and spring means for actuating the packing expanding means, said packing means being located at the inward end of the male member, said packing means being disposed in said female member free of, but to be engaged by the male member.

6. A flexible pipe coupling, comprising, a spherical male member, a female member for receiving rotatably the male members, assembling means for the members, packing means disposed between the male member and the female member, packing expanding means, and spring means for actuating the packing expanding means, said packing means being located at the inward end of the male member, said packing being disposed in said female member free of, but to be engaged by the male member, said packing means being located in an annular groove in the female member.

In testimony whereof I affix my signature.

WALTER R. SMITTLE.